United States Patent
Sachs

(10) Patent No.: US 10,899,548 B2
(45) Date of Patent: Jan. 26, 2021

(54) TELESCOPIC CONVEYOR

(71) Applicant: Gawronski GmbH, Neuhausen (DE)

(72) Inventor: Alexander Sachs, Speyer (DE)

(73) Assignee: Gawronski GmbH, Neuhausen (DE)

( * ) Notice: Subject to any disclaimer, the term of this patent is extended or adjusted under 35 U.S.C. 154(b) by 0 days.

(21) Appl. No.: 16/955,947

(22) PCT Filed: Oct. 25, 2018

(86) PCT No.: PCT/EP2018/000489
§ 371 (c)(1),
(2) Date: Jun. 19, 2020

(87) PCT Pub. No.: WO2019/120597
PCT Pub. Date: Jun. 27, 2019

(65) Prior Publication Data
US 2020/0331702 A1   Oct. 22, 2020

(30) Foreign Application Priority Data
Dec. 21, 2017  (DE) ........................ 10 2017 011 880

(51) Int. Cl.
*B65G 21/14*   (2006.01)
*B65G 15/24*   (2006.01)
(Continued)

(52) U.S. Cl.
CPC ............. *B65G 21/14* (2013.01); *B65G 15/24* (2013.01); *B65G 15/26* (2013.01); *B65G 21/02* (2013.01);
(Continued)

(58) Field of Classification Search
CPC ........ B65G 21/14; B65G 15/24; B65G 15/26; B65G 21/02; B65G 39/00; B65G 47/52;
(Continued)

(56) References Cited

U.S. PATENT DOCUMENTS 3,332,819 A   7/1967   Sicmpelkamp
3,664,488 A * 5/1972   Florian .................. B65G 21/14
                                                      198/813
(Continued)

FOREIGN PATENT DOCUMENTS

DE    10 2009 018 163      12/2010
EP         1826154 A1 *    8/2007    .......... B65G 41/008
(Continued)

OTHER PUBLICATIONS

International Search Report (dated Mar. 21, 2019) for corresponding International App. PCT/EP2018/000489.

*Primary Examiner* — Mark A Deuble
(74) *Attorney, Agent, or Firm* — WRB-IP LLP

(57) ABSTRACT

The present invention provides a telescopic conveyor (1) having at least two conveyor belts (10). Said belts are arranged one above the other and can be moved relative to one another in the longitudinal direction. Each conveyor belt (10) here has a frame (11), a circulatory belt (12) and a first deflecting roller (13) at a first end (A), and a second deflecting roller (14) at a second end (B), of the conveyor belt (10), wherein the second end (B) is a transfer end of the conveyor belt (10), and wherein a bridging device (2', 2) is provided between in each case two adjacent conveyor belts (10) located one above the other, and said device bridges, at least to some extent, the difference in height (H) between the two conveyor belts (10) arranged one above the other, it being necessary for said difference in height to be overcome at the transfer end. The bridging device (2) comprises a ramp (3, 3') with a slope (S) and also a first deflecting roller (4), which is arranged at the higher end of the ramp (3, 3'), as well as a first holding-down device (5), which is arranged beneath the first deflecting roller (4), and also a second holding-down device (7) at the foot of the ramp (3, 3'). The circulatory belt (12) of the respectively lower conveyor belt (Continued)

(10) is guided, from a conveying plane (E1) beneath the second holding-down device (7), over the ramp (3, 3') with the slope (S) and, from there, is deflected over the first deflecting roller (4) and guided back to the conveying plane (E1) beneath the first holding-down device (5). The slope (S) of the ramp (3, 3') continues in stepless fashion tangentially along the circulatory belt (12) of the conveyor belt (10) located above, said circulatory belt being guided over its second end-side deflecting roller (14).

8 Claims, 11 Drawing Sheets

(51) Int. Cl.
*B65G 15/26* (2006.01)
*B65G 21/02* (2006.01)
*B65G 39/00* (2006.01)
*B65G 47/52* (2006.01)
*B65G 47/51* (2006.01)

(52) U.S. Cl.
CPC ............ *B65G 39/00* (2013.01); *B65G 47/52* (2013.01); *B65G 47/5131* (2013.01); *B65G 2207/14* (2013.01)

(58) Field of Classification Search
CPC ............ B65G 2207/14; B65G 47/5131; B65G 47/56; B65G 47/66
USPC .................................................. 198/594–596
See application file for complete search history.

(56) References Cited

U.S. PATENT DOCUMENTS

| | | | | |
|---|---|---|---|---|
| 3,825,107 | A * | 7/1974 | Cary | B65G 21/14 198/313 |
| 3,826,353 | A * | 7/1974 | Greasley | B65G 15/26 198/313 |
| 4,499,988 | A * | 2/1985 | Gasser | B65G 47/647 198/369.2 |
| 6,481,563 | B1 * | 11/2002 | Gilmore | B65G 21/14 198/511 |
| 8,978,871 | B1 * | 3/2015 | Guider | B65G 13/00 198/456 |
| 9,828,184 | B1 * | 11/2017 | Bynum | B65G 15/24 |
| 2004/0012717 | A1 * | 1/2004 | Sprague | G06F 9/451 348/564 |
| 2008/0088143 | A1 | 4/2008 | Michels | |
| 2011/0286825 | A1 | 11/2011 | Michels | |
| 2012/0152699 | A1 * | 6/2012 | Yang | B65G 21/14 198/812 |
| 2015/0060241 | A1 * | 3/2015 | Baek, IV | B65G 21/14 198/812 |
| 2015/0157034 | A1 * | 6/2015 | McEntire, Jr. | B26D 7/088 426/335 |
| 2016/0264366 | A1 * | 9/2016 | Heitplatz | B65G 41/001 |
| 2019/0062063 | A1 * | 2/2019 | Baek | B65G 21/2072 |

FOREIGN PATENT DOCUMENTS

| | | |
|---|---|---|
| EP | 1 908 711 | 4/2008 |
| EP | 1908711 A1 | 4/2008 |
| EP | 2243728 A2 | 10/2010 |
| FR | 1.267.843 | 7/1961 |
| FR | 1267843 A | 7/1961 |

* cited by examiner

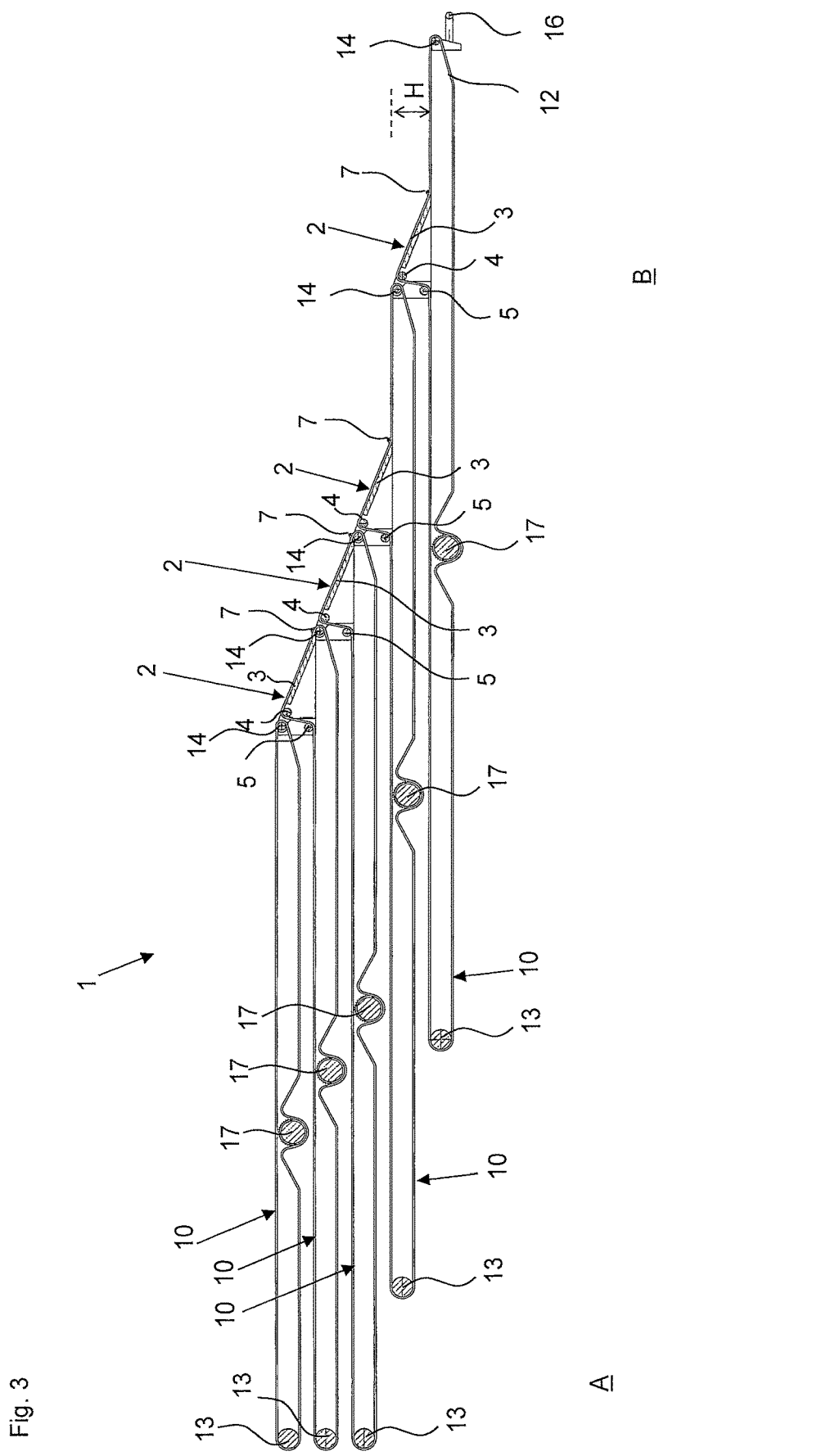

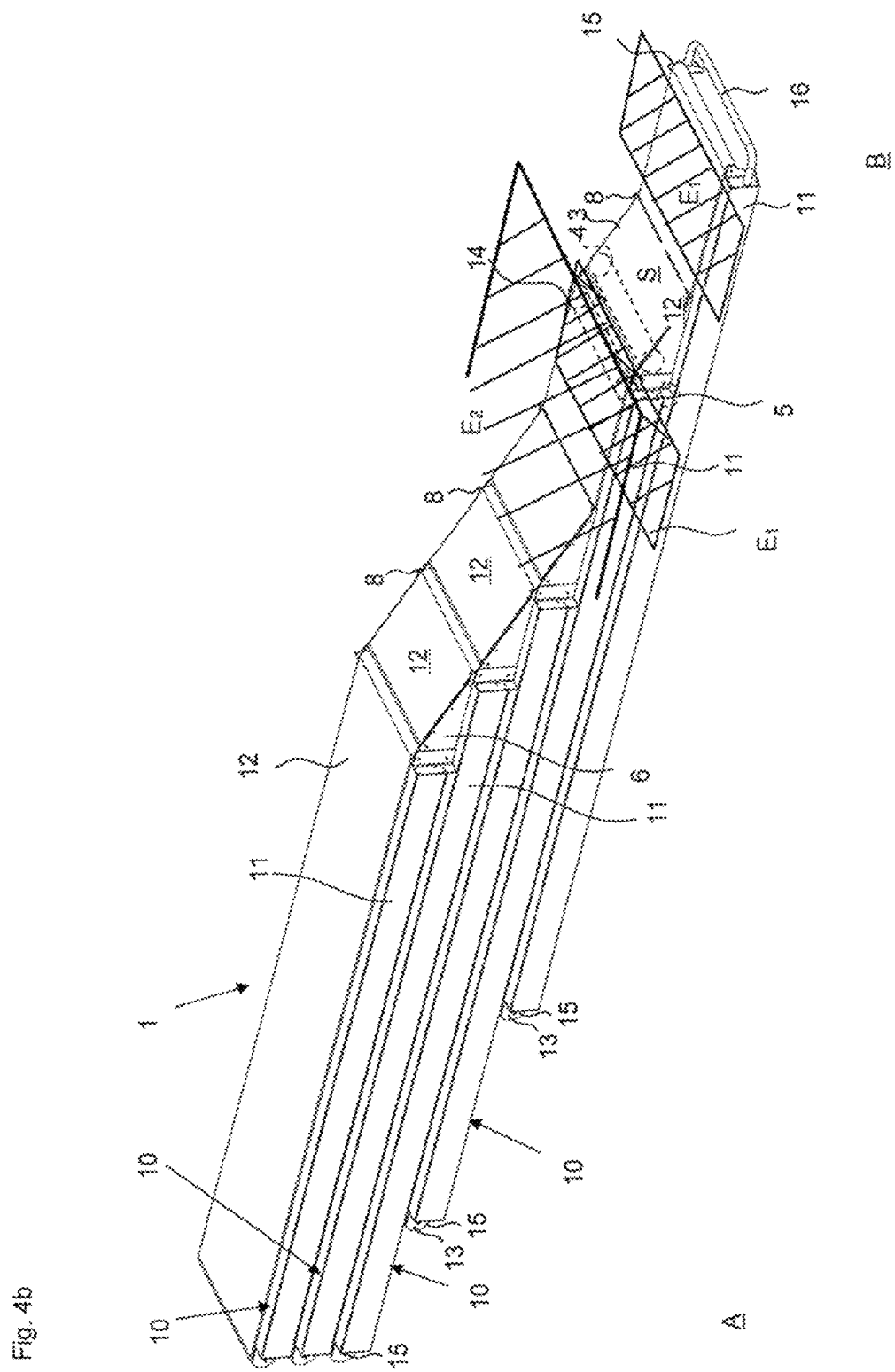

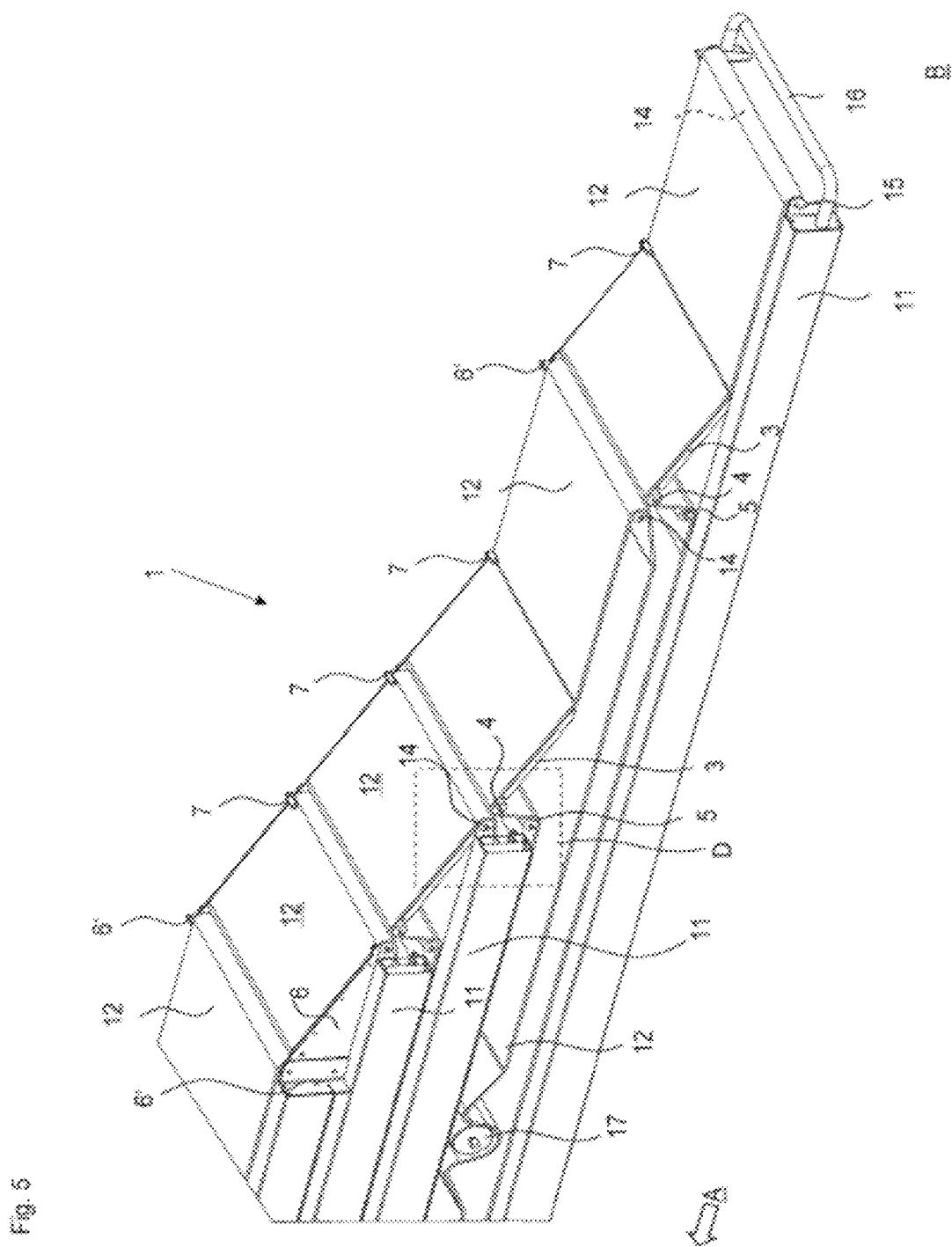

TELESCOPIC CONVEYOR

BACKGROUND OF THE INVENTION

The invention concerns a telescopic conveyor with two or more belt conveyors arranged above each other and movable in length direction relative to each other and with a bridging device that bridges at the transfer end the height difference that must be overcome between two belt conveyors arranged above each other.

Telescopic conveying devices are known in the prior art which are comprised of two or more belt conveyors which are moveable in length direction relative to each other in order to be able to adjust a conveying stretch to a maximum length by an extension movement along its length and/or to retract the conveying device in a space-saving manner when not in use.

Since the telescopic belt conveyors or belt conveyor sections are arranged above each other, the ends will come to rest above each other in a tiered arrangement so that the conveyed goods can be transported in only one direction, namely from the top belt conveyor to the bottom one, when no auxiliary device is structurally provided. A reversal of the conveying direction cannot be realized easily because the conveyed goods, in particular when small articles are concerned, cannot overcome this step or abutting edge.

In order to solve this problem, DE 10 2009 018 163 B4 describes a separate bridging device for telescoping belt conveyors in which the ends of neighboring belt conveyors are positioned in a tiered arrangement above each other in the telescopically extended state. The separate bridging device comprises a frame that, as needed, is attached in the region of the transition of the tiered arrangement from one belt conveyor to the neighboring belt conveyor and comprises at least one rotatable roller that, viewed in transport direction, extends transversely and that divides the total height to be overcome into at least one partial height to be overcome.

As an alternative thereto, there are telescopic conveyors in which a section of the circulating belt at the transfer end that forms the abutting edge is positioned above the lower belt conveyor, is deflected about a deflecting roller with a smaller diameter that is positioned lower. With this downwardly bent end section, the height difference that has to be overcome between belt conveyors positioned adjacently above each other is reduced also.

Even though in both cases a transport from a lower belt conveyor to an upper belt conveyor is enabled, there is still further need for improvement because even these bridging devices still have abutting edges that present obstacles not only for smaller conveyed goods but also for conveyed goods with round shape or elastic material properties. While conveyed goods that are too small still cannot overcome the partial height provided by the roller or the height difference to the bent end section, the abutting edge in case of round and/or elastic articles can lead to these articles to be pushed away or to jump away; in case of sharp-edged or small and flat articles, even jamming may occur.

Based on this prior art, it is the object of the present invention to provide a telescopic conveyor without abutting edge between belt conveyors positioned directly above each other and therefore neighboring each other and with which conveyed goods can be transported in both direction without disturbances.

SUMMARY OF THE INVENTION

This object is solved by a telescopic conveyor with at least two belt conveyors, that are arranged above each other and moveable in length direction relative to each other,
wherein each belt conveyor comprises
a frame,
a circulating belt,
a first terminal deflecting roller at a first end and a second terminal deflecting roller at a second end of the belt conveyor, wherein the second end is a transfer end of the belt conveyor,
and wherein between two belt conveyors positioned above each other and neighboring each other, a bridging device is provided which at least partially bridges the height difference to be overcome at the transfer end between the two belt conveyors that are arranged above each other,
characterized in that
the bridging device comprises
a ramp with a slope and
a first deflecting roller which is arranged at the higher end of the ramp;
a first hold-down device that is arranged below the first deflecting roller, and
a second hold-down device at the foot of the ramp,
wherein the circulating belt of the respective lower belt conveyor is guided, from a conveying plane, below the second hold-down device across the ramp with the slope and from there is guided, deflected across the first deflecting roller and below the second hold-down device, back to the conveying plane,
and wherein the slope of the ramp continues stepless tangentially along the circumferential belt, guided across its second terminal deflecting roller, of the belt conveyor arranged above.

Preferred embodiments are disclosed in the dependent claims.

According to a first embodiment, a telescopic conveyor according to the invention comprises at least two belt conveyors which are arranged above each other and are movable in length direction relative to each other. Such a belt conveyor comprises a frame and a circulating belt that is deflected at terminal deflecting rollers. One of these deflecting rollers is positioned at one end ("first end") of each belt conveyor that—with the exception of the uppermost belt conveyor—is positioned below the belt conveyor arranged above it, and the second deflecting roller is positioned at the second end which is defined as a transfer end of each belt conveyor that—with the exception of the lowermost belt conveyor—ends on a belt conveyor arranged below. At the transfer end, the conveyed goods are transferred between belt conveyors that are positioned above each other and immediately neighboring each other. In order to configure the transfer, a bridging device is provided between two neighboring belt conveyors, respectively. It serves to bridge the height difference to be overcome between the two belt conveyors that are immediately arranged above each other. According to the prior art, this bridging action is possible up to now only partially or incompletely.

According to the invention, the bridging action is perfected and completed. This means: The height difference or the gap between the two belts between which goods are to be transferred is designed to be so ideally small and harmonious that the goods will not get caught or subjected to an impulse due to a step at the transfer location that causes them to jump off the belt conveyor or at least be displaced undesirably on the belt conveyor that receives the goods.

The bridging device is therefore provided at the respective transfer end of a belt conveyor to the following belt conveyor. The bridging device according to the invention comprises for this purpose a ramp with a predetermined slope (predetermined by the height to be overcome) and a first deflecting roller which is arranged at the higher end of the ramp which adjoins thus the belt conveyor arranged above. Moreover, the bridging device comprises a first hold-down device at a position below the first deflecting roller and a second hold-down device at the foot of the ramp. The circulating belt of the respective lower belt conveyor is thus guided from a conveying plane, on which the transported goods are conveyed essentially parallel to the ground, below the second hold-down device at the foot of the ramp across the latter with the slope and extends from there, deflected across the first deflecting roller and below the second hold-down device, back to the aforementioned conveying plane of this belt conveyor. Advantageously, the slope of the ramp continues stepless tangentially along the immediate next higher belt conveyor that is guided across its second terminal deflecting roller, i.e., positioned above the belt conveyor with the just described first conveying plane.

As is known to a person of skill in the art, conveying devices such as the telescopic conveyor according to the invention are mounted also on so-called tables, wherein the table legs are positioned on the factory floor which may indeed have unevenness in the millimeter range. Such unevenness can be compensated due to the bridging device according to the invention and ramp. Also, during conveying onto a transport means, unevenness is to be compensated which is advantageously achieved also in a stepless way by the device according to the invention.

At the transfer end of each belt conveyor, a continuous and thus stepless transition for the goods to be transported is ensured by means of the bridging device—this is achieved basically in that a tangential plane of the first deflecting roller which is arranged at the higher end of the ramp is aligned with the inclined plane which is formed by the ramp, and preferably also the tangential plane of the corresponding second deflecting roller of the belt conveyor positioned above which is essentially not part of the bridging device but contributes to its effect.

Foot of the ramp means herein the transition of each belt from its conveying plane which is level with the ground into the slope of the ramp. In order for the belt not to lift up here, it must be held down; likewise at the location at which it is returned into the conveying plane at the end of the slope. Therefore, hold-down devices are provided at these two positions.

The first hold-down device which is below and suitably in front of (i.e., advantageously not below the ramp) of the first deflecting roller of the top end of the ramp can advantageously be a hold-down roller, but a hold-down pin or a hold-down rod is also conceivable. The second hold-down device at the foot of the ramp can be a hold-down pin or hold-down rod or a strip—in order not to disturb the goods, it is also possible that, on both sides at the width of the belt, two hold-down pins, rods or strip sections can be arranged opposite to each other, whose length is only so small that the circulating belt can be held down reliably and is guided reliably across the ramp. A pair of these elements forms then the hold-down device.

Regarding the term "belt conveyors": This could have also been "conveyor belt"; "a belt conveyor" is to be understood herein as a device which has a frame which has at least two lateral frame parts, for example, profile elements such as e.g. profile rails and optionally also sliding blocks, which are connected to each other by the deflecting rollers at both ends and their holding devices. The circulating belt is guided across the deflecting rollers; all this is known to a person of skill in the art, also in relation to the drive of the rollers.

Also, it is prior art to arrange a plurality of belt conveyors above each other in such a way that, for example, by means of a grip which is present at a lowermost of the belt conveyors of a telescopic conveyor, beginning with it, the telescopic conveyor can be pulled out so that the frame parts movable relative to each other of each belt conveyor can be pulled out like a drawer and thereby entrain ("telescope") the next upper frame by means of the sliding blocks/followers. It is to be understood that so-called universal belts can be pulled out at both ends or in both directions; it is therefore also possible that a grip for pull-out is provided at an uppermost belt. The pulling-out action can also be carried out by a motor instead of being manually performed; then, instead of the grip, a corresponding driven pull-out device is present. Such telescopic conveyors that are extendable by a drive are used, for example, in order to move the belt conveyor in a transport vehicle from which or into which is to be conveyed.

The second terminal deflecting roller of an upper belt conveyor of a telescopic conveyor ("upper" in relation to a neighboring belt conveyor arranged underneath) is constructively correlated with the upper frame anyway; at the latter, the bridging device of a lower belt conveyor can then also be arranged and secured thereat so that, in relation to the frame of the respective lower belt conveyor, it is movable in length direction. Upon extension of a lower belt conveyor, the bridging device with the circulating belt of the lower belt conveyor guided across remains at the transfer end of the neighboring belt conveyor arranged above.

The attachment of the bridging device of the lower belt conveyor and of the second terminal deflecting roller of the neighboring upper belt conveyor arranged above can be realized by means of two lateral frame elements, preferably even by means of a respective angle element that is connected to each lateral frame element.

The slope and the length of the ramp as well as positioning of the deflecting rollers are matched to the height difference that is to be overcome between the neighboring belt conveyors that are arranged above each other. By a suitable selection of the slope, the bridging device can be matched optimally to different predetermined conveying speed.

An embodiment provides furthermore that the slope of the ramp and position of the rollers can be varied for adaptation. For this purpose, for example, the bridging device of the lower belt conveyor and the second terminal deflecting roller of the neighboring upper belt conveyor arranged above can be connected by a pivot joint to each other; the pivot joint connects the two lateral frame elements with the adjoining angle elements so that the ramp is movable such that thereby unevenness, primarily in the millimeter range, can be compensated.

The inclined plane which is provided by the ramp can be formed by a plate or a plurality of transverse rollers which are arranged at a steady incline.

Further embodiments as well as some of the advantages which are connected with these and further embodiments will become clear and better understood by the following detailed description with reference to the accompanying Figures. Objects or parts thereof which are substantially identical or similar may be provided with the same reference characters. The Figures are only a schematic illustration of an embodiment of the invention.

BRIEF DESCRIPTION OF THE DRAWINGS

It is shown in:

FIG. 3 a section view of the telescopic conveyor according to the invention of FIG. 2;

FIG. 4 FIG. 4a a perspective view of the telescopic conveyor according to the invention of FIG. 2 and FIG. 4b the perspective view of FIG. 4a, with planes;

FIG. 5 an enlarged perspective detail view of the telescopic conveyor according to the invention of FIG. 4 with partial views of the guiding action of the belt conveyor;

DESCRIPTION OF PREFERRED EMBODIMENTS

The device according to the invention concerns a telescopic conveyor in which the height difference at the transfer end between two belt conveyors, arranged immediately above each other and thus neighboring each other, is overcome by a bridging device without abutting edge so that conveyed articles of almost any size, shape and even elastic material, but also small and angled objects, can be transported without disturbances, or in any case with very little disturbance, from a lower onto an upper belt conveyor or also in reverse direction.

Figure 1:
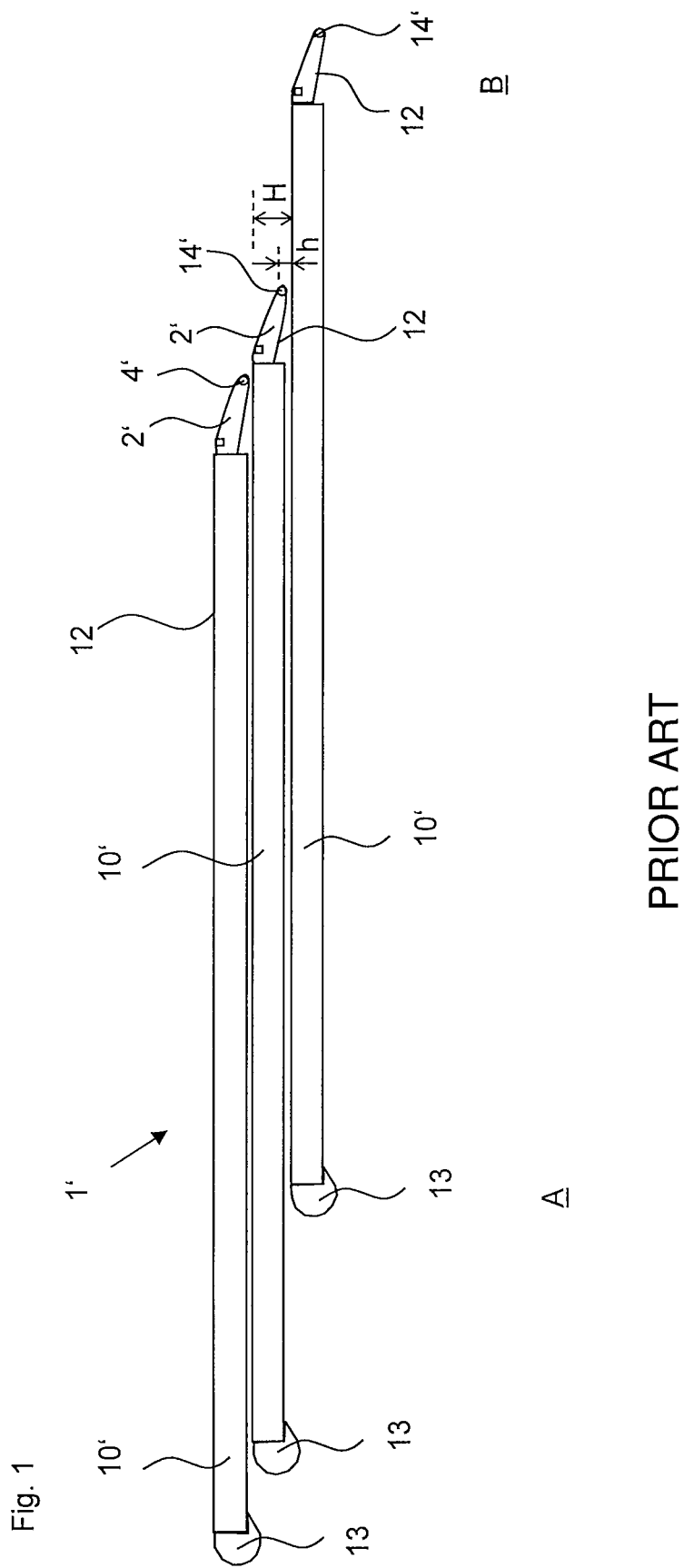
FIG. 1 a side view of a telescopic conveyor of the prior art.

FIG. 1 shows a telescopic conveyor 1' of the prior art. In this example, the telescopic conveyor 1' comprises three belt conveyors 10' which are arranged above each other and overlapping. The length of the telescopic conveyor 1' is variable and is adjusted by pulling out or pushing together belt conveyors 10' which are movable in length direction relative to each other. For this purpose, each belt conveyor 10' comprises a frame which is not indicated in FIG. 1. In general, such frames are formed by profile elements wherein the arrangement of the individual frames positioned above each other is configured such, for example, as a profile rail with longitudinal groove, that the frame of a belt conveyor with a counter profile element, which can be formed also by a rail or e.g. sliding blocks which are fastened to a substructure frame, is/are arranged glidingly on the substructure frame and glidingly at the frame arranged above (not illustrated).

Each belt conveyor 10' comprises a circulating belt 12 which is deflected at a deflecting roller 13 at a first end A of the belt conveyor 10' and at a deflecting roller 14' at a second end B. The second end B of each belt conveyor 10' is referred to as transfer end at which a conventional bridging device 2' is located which only partially bridges the height difference H to be overcome between two belt conveyors 10' arranged above each other. The bridging device 2' is formed here by a bent end section of the circulating belt 12 which is achieved by a lowered arrangement and a reduced diameter of the deflecting roller 14' at the transfer end B. As can be seen in FIG. 1, a step with a residual height difference h that has to be overcome remains between neighboring (positioned closest to each other) belt conveyors 10'. This is also disadvantageous in particular when articles are to be transported from a lower to an upper belt conveyor 10'. Round and/or elastic articles run the risk of jumping, as the case may be even off the belt, due to the impulse imparted when passing from the bridging device to the next belt. Smaller articles may cant and get caught.

FIGS. 2 to 10 show telescopic conveyors 1 according to the invention or details thereof. It is noted that the number of the belt conveyors 10 of the telescopic conveyor 1 according to the invention is not limited to the exemplary number of belt conveyors 10 illustrated in the drawings. It is easily apparent that a telescopic conveyor 1 according to the invention, beginning with two telescoping belt conveyors 10 arranged above each other, can comprise any number of telescoping belt conveyors 10 arranged above each other in which a bridging device 2 according to the invention is arranged between neighboring belt conveyors 10, respectively.

Figure 9:
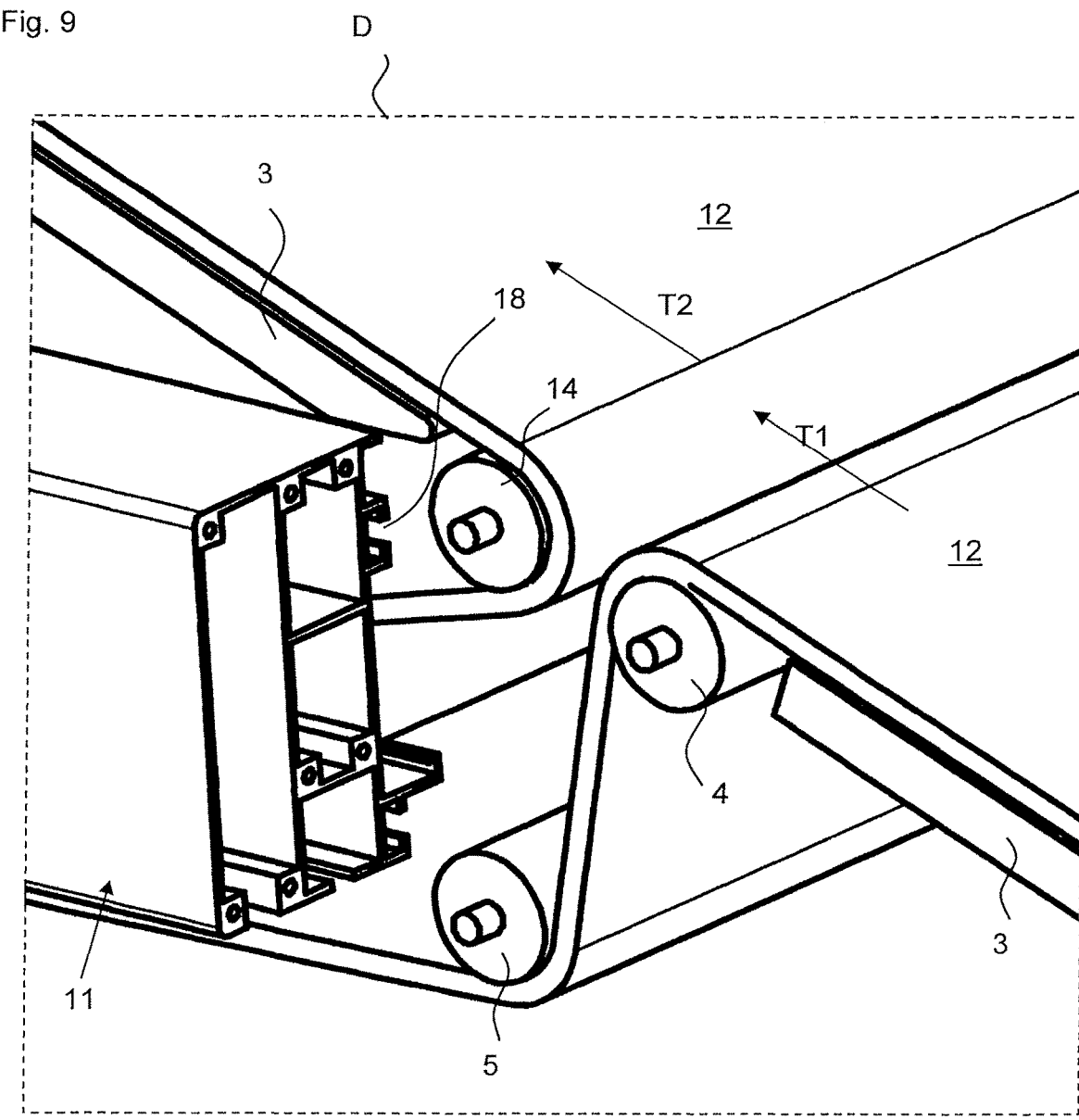
FIG. 9 a detail view D of FIG. 5 of the transition region between neighboring belt conveyors.

FIGS. 2 to 4b show a telescopic conveyor 1 according to the invention; FIGS. 5 and 9 show details thereof. Here, the telescopic conveyor 1 comprises five belt conveyors 10 which are arranged overlapped above each other and are moveable in length direction relative to each other. In the exemplary illustration, the two lower belt conveyors 10 are shown partially extended which is only one possible arrangement of use.

Each belt conveyor 10 has a frame 11 which can be designed essentially as known from the prior art (and can be mounted on a table, also not illustrated) and a circulating belt which is deflected at terminal deflecting rollers 13, 14. In the Figures, the letter "A" shows respectively the side of the first ends of each belt conveyor 10 with the first deflecting roller 13 and the letter "B" illustrates the side of the second ends or transfer ends of each belt conveyor 10 with the second deflecting roller 14. The deflecting rollers 13, 14 are supported in roller holders 15. Due to the circulating belts 12, not all of the deflecting rollers 13, 14 are visible; in FIG. 4a, at one location, which is emphasized by the specified oval dashed detail D, deflecting rollers 14, 4 and a hold-down roller 5 are indicated in dashed lines in an exemplary fashion for all corresponding positions—they form the essential element of the invention, the bridging device 2.

FIG. 4b, on the other hand, shows in an exemplary fashion the conveying mechanism from a lower conveying belt 10 onto a belt conveyor 10 positioned above: Goods (not illustrated) are conveyed on the circulating belt 12 of the lower belt conveyor 10 and move in a plane E1. Along the ramp 3, the goods cross a slope S and are then transferred onto the following circulating belt 12 of the belt conveyor 10 arranged above: They continue to run now on the next plane E2. Usually, the two planes E1, E2 are arranged parallel to the ground. The belt conveyor 10 which is positioned in plane E1, after having passed the ramp 3, is deflected downwardly by means of the deflecting roller 4 and passes underneath the hold-down roller 5 in order to continue in plane E1. This applies to all circulating belts 12 which are guided across a bridging device 2.

Figure 2:
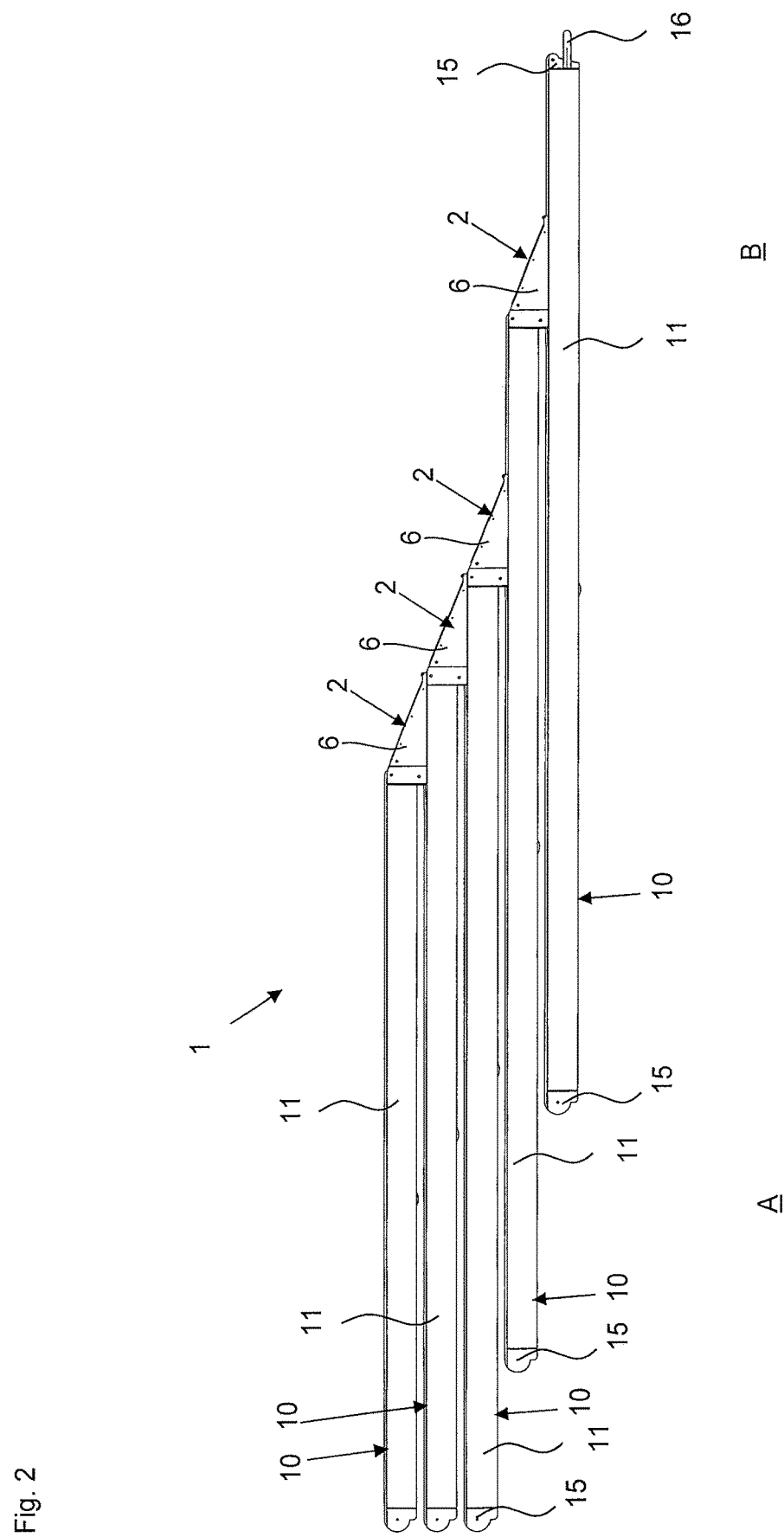
FIG. 2 a side view of a telescopic conveyor according to the invention.
Figure 4A:
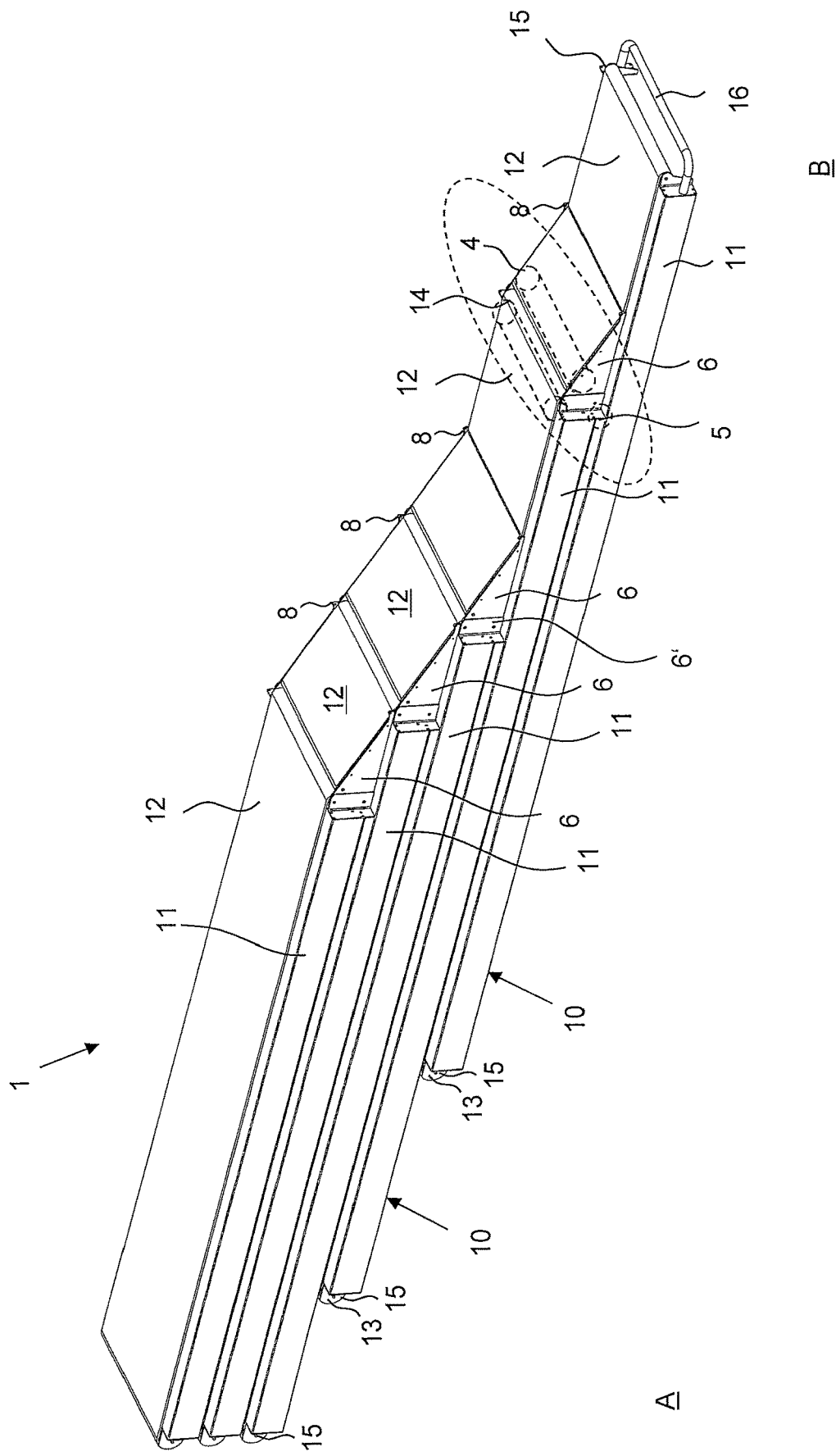
Figure 10A:
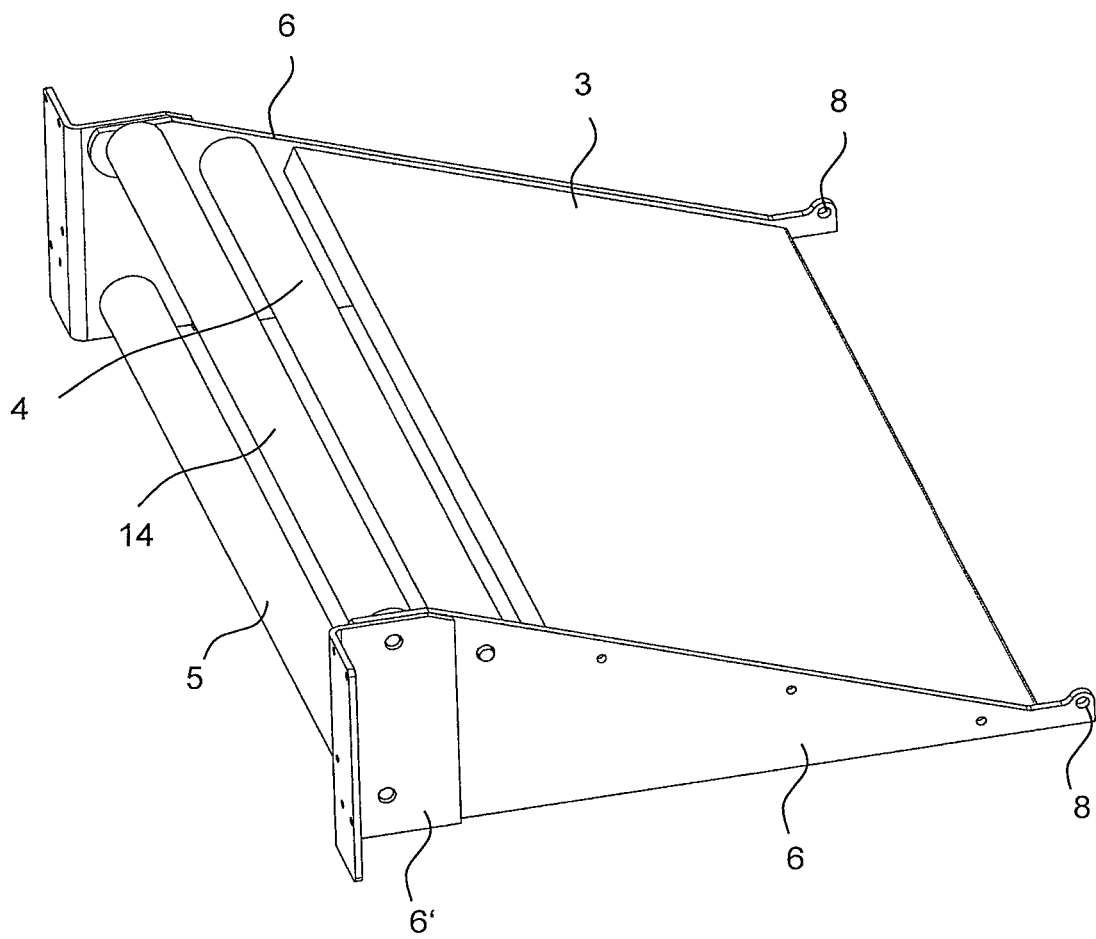
FIG. 10 FIG. 10a a perspective view of a bridging device and FIG. 10b the variant of this bridging action with pivot joint arrangement.

The latter (including a deflecting roller 14 which is interacting with the bridging device 2) is illustrated also in detail in FIG. 10a in one embodiment. It enables an abutment edge-free transition between two neighboring belt conveyors 10 of a telescopic conveyor 1 arranged above each other. One of the bridging devices 2 according to the invention, see, for example, FIGS. 2 and 3, is arranged respectively between two neighboring belt conveyors 10 arranged above each other. It completely bridges the height difference H (illustrated in FIG. 3) that must be overcome at the transfer end between the two belt conveyors 10 arranged above each other and with steady incline or slope, without an abutment edge being formed. As shown in FIG. 3, the remaining gap which is still present between the two belt conveyors between which a transfer is to take place is minimized. Thus, also small, round and/or elastic articles can be transported without disturbance. In particular for round and/or elastic articles such as, for example, tires for passenger cars or trucks, the bridging device 2 according to the invention also improves the transport from an upper to a lower belt conveyor 10: Due to the steady slope of the bridging device 2 according to the invention, a "free fall" across an abutment edge is avoided so that the articles upon transfer from an upper to a lower belt conveyor are conveyed in a controlled fashion and do not jump off or roll off.

In FIGS. 3 and 5, drive rollers 17 are visible in addition. In the illustrated embodiment, each belt conveyor comprises a drive roller 17 in the central region. For simplification of the illustration, the deflecting rollers which are required for this are omitted but are apparent from the illustrated guiding action of the circulating belt 12 about the drive roller 17 because any directional change of the belt 12 requires a corresponding deflection means.

Figure 6:
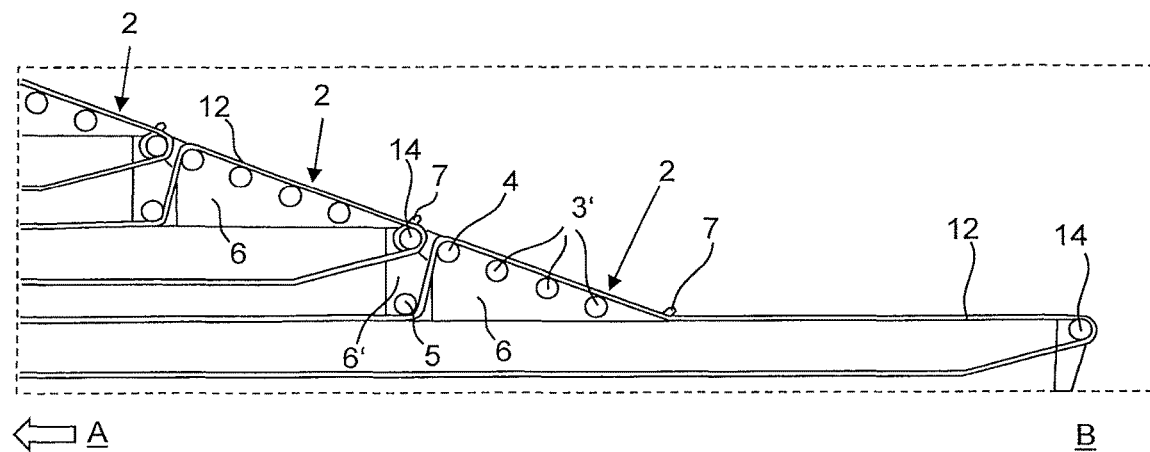
FIG. 6 a section view of a part of a telescopic conveyor according to the invention according to an alternative embodiment.
Figure 7:
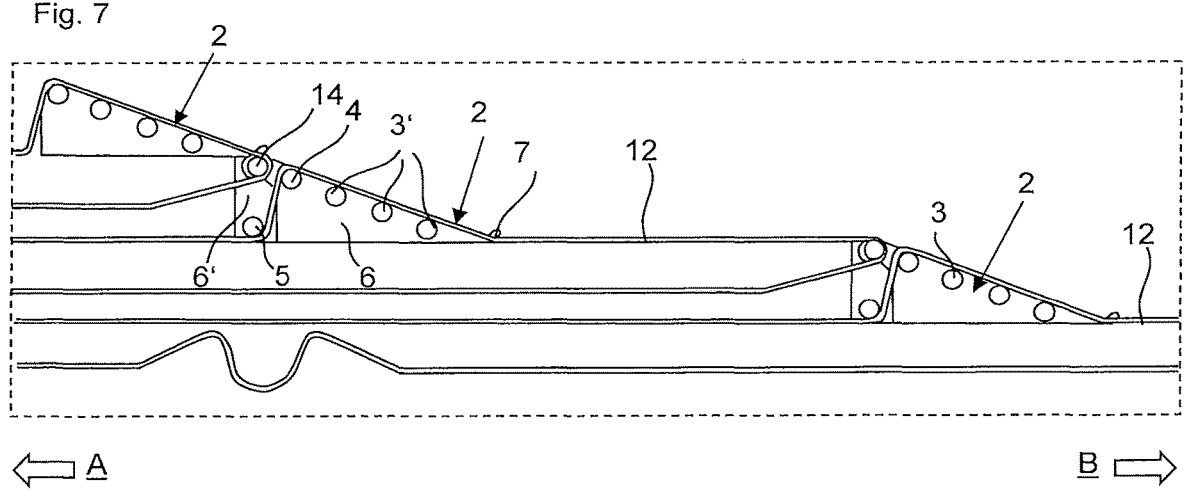
FIG. 7 a section view in accordance with FIG. 6 in a partially telescoped state.

The bridging device 2 according to the invention comprises a ramp 3, 3' that, as shown in FIGS. 2 through 5, 9 and 10, can be formed by a plate 3 arranged at an incline or, as shown in FIGS. 6 and 7, by a plurality of transverse rollers 3' arranged at a steady incline. It is, of course, understood here also that, different from what is illustrated, the plate 3 which forms the inclined plane of the ramp can be assembled of a plurality of partial pieces which optionally can be arranged also at a distance from each other as long as they are located in a common plane. Correspondingly, the alternative embodiment of the ramp 3' of a plurality of transverse rollers 3' arranged at an incline is not limited to the number of three as illustrated. Also more or fewer transverse rollers 3' can be used for producing the inclined plane of the ramp, depending on the height difference H that must be overcome.

At the upper end of the ramp 3, 3', a first deflecting roller 4 is arranged such that a tangential plane of this deflecting roller 4 is aligned with the inclined plane provided by the ramp 3, 3'. Furthermore, a second deflecting roller 14 is provided which is arranged at the side of the first deflecting roller 4 facing away from the ramp 3, 3', neighboring it but somewhat above it, so that this second deflecting roller 14 comprises also a tangential plane which is aligned with the inclined plane provided by the ramp 3, 3'.

Below the two deflecting rollers 4, 14, a hold-down roller 5 is arranged so that the circulating belt 12 of the respective lower belt conveyor 10 is guided across the ramp 3, 3', is deflected about the first deflecting roller 4 and passed underneath the hold-down roller 5 while the circulating belt 12 of the neighboring belt conveyor 10 arranged above is deflected about the second deflecting roller 14 of the bridging device 2 which thus forms the deflecting roller 14 at the transfer end of the respective upper belt conveyor 10. With the circulating belt 12 of the lower belt conveyor 10 which is guided across the ramp 3, 3' and the deflecting roller 4, the height difference H to the neighboring upper belt conveyor 10, whose circulating belt 12 is deflected by the second deflecting roller 14 of the bridging device 2, is overcome by a steady incline or slope without abutment edge; see also in this context FIG. 4b in which the situation is illustrated by the planes.

Figure 8:
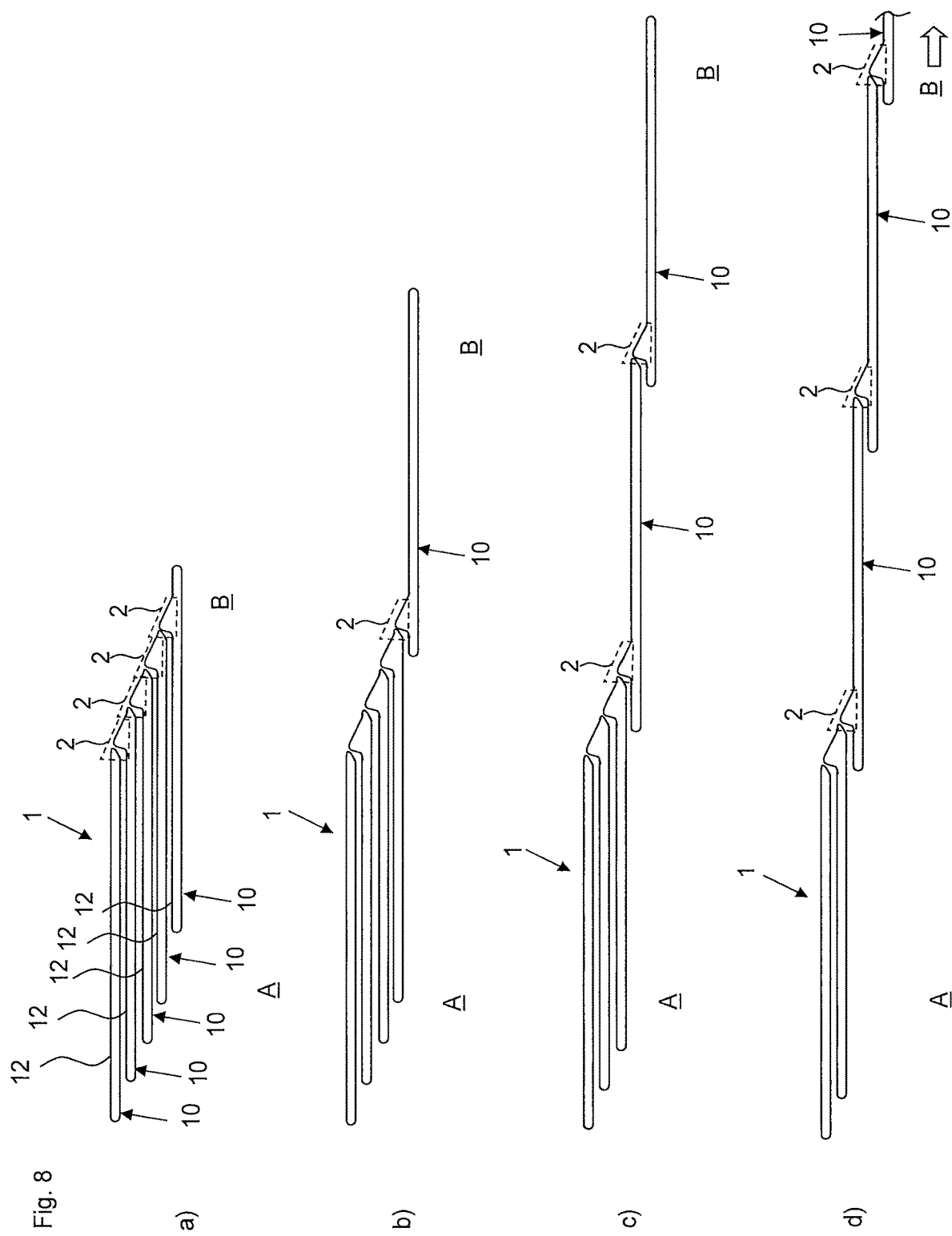
FIG. 8 schematic side views of the circulating belts of a telescopic conveyor according to the invention in a) pushed-together state and b-d) increasingly telescoped state.

The bridging device 2 is connected with the second deflecting roller 14 to the respective upper belt conveyor 10 while, in relation to the frame 11 of the respective lower belt conveyor 12, it is movable in length direction so that it remains upon telescoping action of the belt conveyor 10 at the respective transfer end B of the respective upper belt conveyor 10. This is illustrated in the schematically illustrated sequence a) to d) in FIG. 8 in which, for simplification, only the circulating belt 12 is illustrated. The region of the bridging device 2 is indicated by dashed lines. The block arrow in FIG. 8d, shown adjacent to the letter "B", is only meant to illustrate, as in FIGS. 5 through 7, that the corresponding belt conveyor end A, B are outside of the region of illustration.

Telescoping of the telescopic conveyor 1 can be done manually. For this purpose, in the illustrated embodiment at the lowermost belt conveyor 10 at the second end B, a grip is provided by which, as sketched in FIG. 8, first the lowermost belt conveyor 10 can be pulled out. Once the lowermost belt conveyor 10 has been completely extended, upon further pulling action at the grip 16 the next upper belt conveyor 10 is pulled out by mandatory coupling, etc. Upon pushing in, first the lowermost belt conveyor 10 is completely pushed in correspondingly before the next upper belt conveyor 10 is pushed in. Depending on the type of coupling of the telescoping belt conveyors 10, the telescopic conveyor 1 can also be configured such that, with the extension of the lowermost belt conveyor 10, the upper belt conveyors 10, similar to a multiple cable pull mechanism, are successively also extended prior to the lowermost belt conveyor 10 being completely extended.

Moreover, it should be noted that there are further configurations of the telescopic conveyor according to the invention in which, however, it is not the lowermost table or the lowermost belt conveyor that is pulled out first but absolutely even another, central or even the uppermost belt conveyor, for example, by means of corresponding legs. However, this is known to a person of skill in the art and does not change the technical teaching that is constituted by the bridging device.

Of course, a telescopic conveyor 1 according to the invention can also be extended and retracted automatically when the telescopic belt conveyors 10 are provided with corresponding hydraulic, pneumatic, electric and/or mechanical drive and transmission elements and a corresponding control unit.

Figure 10B:
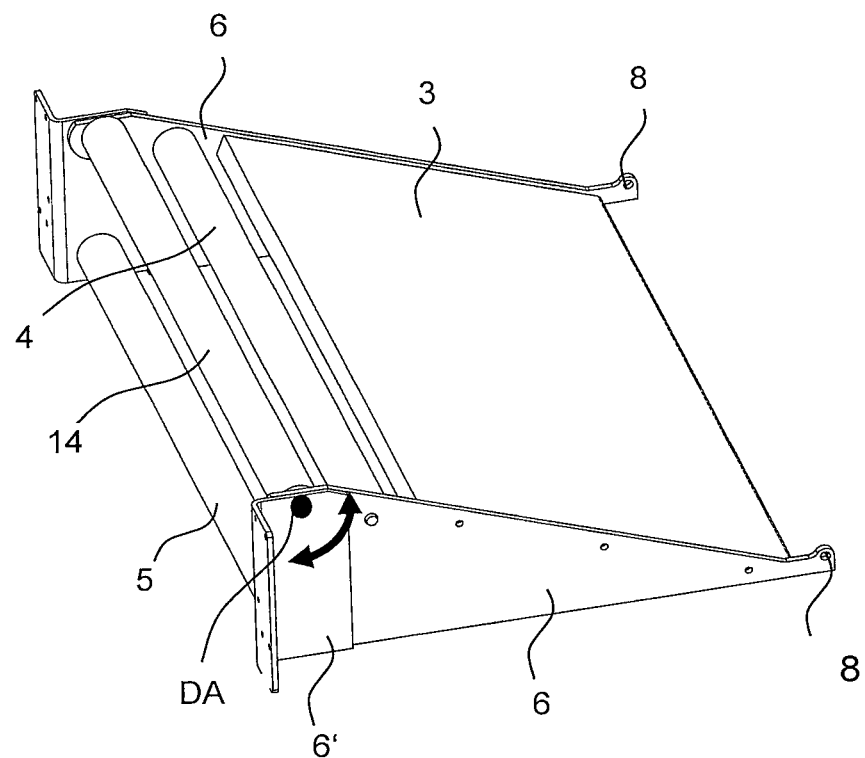

The bridging device 2, see also FIGS. 10a and 10b, is laterally limited by a frame element 6, respectively, between which the ramp 3, 3', the deflecting rollers 4, 14, and the hold-down roller 5 are fastened. The frame element 6 is supplemented by an angle piece 6' that also serves for attachment at the frame 11 of the respective upper belt conveyor 10, as can be seen, for example, in FIGS. 4 and 5. The angle piece 6' overlaps a part of the frame element 6 that, for receiving the deflecting rollers 4, 14, is rounded at the upper end in a tab-like manner, as can be seen in FIG. 10, so that the angle piece 6' together with the frame element 6 holds the second deflecting roller 14. The hold-down roller 5 is held only by the supplementing angle piece 6'.

As indicated in addition by the configuration of the device in FIG. 10b, it can be provided that the two lateral frame elements 6 are connected by a pivot joint with the angle piece 6' so that the ramp 3 is movable and unevenness of the ground can be compensated—the deflecting roller 14 forms than the axis (axis of rotation DA) about which the ramp 3 can be pivoted; see block arrows.

Furthermore, the frame element 6 is provided at the lower end of the ramp 3 with a receptacle 8 for a hold-down element 7 (compare e.g. FIG. 5) that serves to hold down the circulating belt 12, guided across the ramp 3, at its edge so that the belt 12 is contacting the ramp 3. The hold-down element 7 preferably does not extend transverse across the circulating belt 12 because it would then also form an abutment edge. In contrast to what is illustrated, optionally the hold-down element can also be formed as one piece together with the frame element so that the configuration of a receiving device therefor it is not needed thereat.

FIG. 9 shows a detail D at the transition between two neighboring belt conveyors 10 as it is provided by the bridging device 2 according to the invention with the ramp 3, the deflecting rollers 4, 14, and the hold-down roller 5 with the described guiding action of the circulating belts 12. In the pushed-in state, the bridging devices 2 of neighboring belt conveyors 10 are positioned so as to directly adjoin each other wherein the ramps 3 and thus the circulating belts 12 of neighboring belt conveyors 10 are aligned with each other with the steady incline. Moreover, in FIG. 9 the frame 11 can be seen at whose end face the bridging device is connected with the angle piece 6', not illustrated here. The frame 11 is comprised here of a plurality of profile elements with profile grooves, e.g. profile groove 18, e.g. for supporting the drive roller 17.

LIST OF REFERENCE CHARACTERS 1 telescopic conveyor
2 bridging device
3, 3' ramp made of a plate
3' ramp made of rollers
4 first terminal deflecting roller
5 hold-down roller
6, 6' frame element, angle piece
7 hold-down element
8 hold-down receptacle
10 belt conveyor
11 frame
12 circulating belt
13 first deflecting roller
14 second terminal deflecting roller
15 roller holder
16 grip
17 drive roller
18 profile groove
A, B first end, second or transfer end
D detail
DA axis of rotation
E1, E2 planes
H, h height difference to be overcome, remaining abutting edge height
S slope
1' telescopic conveyor, prior art
2' bridging device, prior art
4' first terminal deflecting roller, prior art
10' belt conveyor, prior art
14' terminal deflecting roller

What is claimed is:

1. A telescopic conveyor comprising:
at least two belt conveyors arranged above each other and moveable in a length direction relative to each other, wherein the at least two belt conveyors each comprise a frame, a circulating belt, a first terminal deflecting roller at a first end of the belt conveyor and a second terminal deflecting roller at a second end of the belt conveyor, wherein the second end of the belt conveyor is a transfer end of the belt conveyor;
wherein the at least two belt conveyors include a first belt conveyor and a second belt conveyor, wherein the second belt conveyor is positioned above the first belt conveyor and wherein the first and second belt conveyors are neighboring each other;
a bridging device arranged between the first and second belt conveyors and configured to bridge at least partially a height difference to be overcome between the first and second belt conveyors at the transfer end of the second conveyor, wherein the bridging device comprises:
a ramp with a slope and comprising a top end and a foot;
a first deflecting roller arranged at the top end of the ramp;
a first hold-down device arranged below the first deflecting roller; and
a second hold-down device at the foot of the ramp;
wherein the circulating belt of the first belt conveyor comprises a conveying plane, wherein the circulating belt passes from the conveying plane below the second hold-down device, continues across the ramp with the slope, and passes from the top end of the ramp with the slope across the first deflecting roller, and passes below the first hold-down device back to the conveying plane; and
wherein the slope of the ramp continues stepless tangentially along the circulating belt of the second belt conveyor guided across the second terminal deflecting roller of the second belt conveyor.

2. The telescopic conveyor according to claim 1, wherein the first hold-down device is a hold-down roller, a hold-down pin or a hold-down rod.

3. The telescopic conveyor according to claim 1, wherein the second hold-down device is a hold-down pin or a hold-down rod or a strip.

4. The telescopic conveyor according to claim 1, wherein the first hold-down device is a hold-down roller, a hold-down pin or a hold-down rod, and wherein the second hold-down device is a hold-down pin or a hold-down rod or a strip.

5. The telescopic conveyor according to claim 1, wherein the bridging device of the first belt conveyor and the second terminal deflecting roller of the second belt conveyor are fastened to the frame of the second belt conveyor and are movable in the length direction in relation to the frame of the first belt conveyor.

6. The telescopic conveyor according to claim 5, wherein the bridging device of the first belt conveyor and the second terminal deflecting roller of the second belt conveyor are fastened to the frame of the second belt conveyor by an attachment comprising a first lateral frame element and a second lateral frame element.

7. The telescopic conveyor according to claim 6, wherein the attachment further comprises a first angle element connected to the first lateral frame element and a second angle element connected to the second lateral frame element.

8. The telescopic conveyor according to claim 1, wherein the ramp is formed by a plate or a plurality of transverse rollers arranged at a steady incline.

\* \* \* \* \*